(12) United States Patent
Corma Canos et al.

(10) Patent No.: US 8,115,001 B2
(45) Date of Patent: Feb. 14, 2012

(54) ZEOLITE ITQ-30

(75) Inventors: Avelino Corma Canos, Valencia (ES); María José Díaz Cabañas, Valencia (ES)

(73) Assignees: Consejo Superior De Investigaciones Cientificas, Madrid (ES); Universidad Politecnica De Valencia, Valencia (ES)

( * ) Notice: Subject to any disclaimer, the term of this patent is extended or adjusted under 35 U.S.C. 154(b) by 1162 days.

(21) Appl. No.: 11/597,808

(22) PCT Filed: May 25, 2005

(86) PCT No.: PCT/ES2005/070072
§ 371 (c)(1),
(2), (4) Date: Jun. 12, 2007

(87) PCT Pub. No.: WO2005/118476
PCT Pub. Date: Dec. 15, 2005

(65) Prior Publication Data
US 2008/0027247 A1    Jan. 31, 2008

(30) Foreign Application Priority Data
May 28, 2004  (ES) .................................. 200401391

(51) Int. Cl.
*C07D 221/18*    (2006.01)
(52) U.S. Cl. ......................................... 546/26; 423/718
(58) Field of Classification Search ........................ None
See application file for complete search history.

(56) References Cited

U.S. PATENT DOCUMENTS

| | | | |
|---|---|---|---|
| 4,439,409 A | 3/1984 | Puppe et al. | |
| 4,954,325 A | 9/1990 | Rubin et al. | |
| 5,236,575 A * | 8/1993 | Bennett et al. | 208/46 |
| 5,362,697 A | 11/1994 | Fung et al. | |
| 6,043,179 A | 3/2000 | Davis et al. | |
| 6,797,254 B2 * | 9/2004 | Corma Canos et al. | 423/706 |
| 6,849,248 B2 * | 2/2005 | Corma Canos et al. | 423/718 |
| 6,896,869 B2 * | 5/2005 | Corma Canos et al. | 423/718 |
| 6,916,459 B2 * | 7/2005 | Corma Canos et al. | 423/718 |
| 7,008,611 B2 * | 3/2006 | Canos et al. | 423/718 |
| 7,029,651 B2 * | 4/2006 | Canos et al. | 423/718 |
| 2004/0038804 A1 | 2/2004 | Kato et al. | |

FOREIGN PATENT DOCUMENTS
ES    2 192 935    10/2003

OTHER PUBLICATIONS

Raul F. Lobo et al., "*Synthesis and characterization of pure-silica and boron-substituted SSZ-24 using N(16) methylsparteinium bromide as structure-directing agent*", Microporous Materials, vol. 3, pp. 61-69 (1994).

K. Tsuji et al., "*High-silica molecular sieve syntheses using the sparteine related compounds as structure-directing agents*", Microporous and Mesoporous Materials, vol. 28, pp. 461-469 (1999).

* cited by examiner

*Primary Examiner* — Sudhakar Katakam
(74) *Attorney, Agent, or Firm* — Wenderoth, Lind & Ponack, L.L.P.

(57) ABSTRACT

The invention relates to a laminar microporous crystalline zeolite material known as ITQ-30 which, as when synthesized, has a chemical composition in the anhydrous state with the following molar relations: $x\,(M_{1/n}\,XO_2):y\,YO_2:SiO_2:z\,R$, wherein: x represents a value less than 0.1, which can be equal to zero; y has a value of less than 0.1, which can be equal to zero; z has a value of less than 0.1; M is selected from among $H^+$, $NH_4^+$, one or more $+n$ inorganic cations and combinations of same; X represents one or more +3 oxidation state chemical elements; Y represents one or more +4 oxidation state chemical elements; and R represents one or more organic compounds. The invention also relates to the method of preparing said zeolite, involving the use of one or more organic additives in a reaction mixture which is crystallized by means of heating, and to the use thereof in processes for the separation and transformation of organic compounds.

46 Claims, No Drawings

ZEOLITE ITQ-30

FIELD OF APPLICATION

Microporous materials

BACKGROUND INFORMATION

Zeolites are microporous crystalline materials comprised of a crystalline network of $TO_4$ tetrahedra which share all of their vertexes give rise to a three-dimensional structure containing channels and/or cavities of molecular dimensions. They are of varying compositions, and T generally represents atoms in a formal +3 or +4 oxidation state, such as, for example Si, Ge, Ti, Al, B, Ga, . . . . If any of the T atoms has an oxidation state of under +4, the crystalline network formed has negative charges which are offset by means of the presence of organic or inorganic cations in the channels and cavities. In these channels and cavities, organic molecules and $H_2O$ can also be housed, therefore being possible to state the chemical composition of zeolites using the following empirical formula:

$$x\,(M_{1/n}XO_2){:}y\,YO_2{:}z\,R{:}w\,H_2O$$

where M represents one or more +n organic or inorganic cations; X represents one or more trivalent elements; Y represents one or more tetravalent elements, generally Si; and R represents one or more organic compounds. Although by means of post-synthesis treatments, the nature of M, X, Y and R and the values of x, y, z, and w can be varied, the chemical composition of a zeolite (as when synthesized or following the calcination thereof) possesses a characteristic range of each zeolite and of the method for obtaining the same.

On the other hand, the crystalline structure of each zeolite, with a specific network of channels and cavities, gives rise to a characteristic X-ray diffraction pattern. Therefore, zeolites differ from one another due to the range of their chemical composition plus their X-ray diffraction pattern. Both of these characteristics (crystalline structure and chemical composition) also determine the physicochemical properties of each zeolite and the possible application thereof in different industrial processes.

In U.S. Pat. No. 4,439,409, a description is provided of a material referred to as PSH-3 and the method for synthesizing the same by using hexamethyleneimine as the structure-directing agent. Subsequent thereto, other materials having certain similarities also obtained by hexamethyleneimine, such as MCM-22 (U.S. Pat. No. 4,954,325), MCM-49 (U.S. Pat. No. 5,236,575) and MCM-56 (U.S. Pat. No. 5,362,697) have been described.

DESCRIPTION OF THE INVENTION

The invention relates to a laminar microporous crystalline zeolite material characterized in that it has an X-ray diffraction pattern in accordance with Table I.

TABLE I

| d(Å) (±0.3) | I/I$_o$ (%) |
|---|---|
| 14.17 | VS |
| 12.13 | M |
| 10.63 | M |
| 4.65 | M |
| 3.98 | S |
| 3.42 | VS |
| 3.32 | M | as when synthesized and because it has a chemical composition in the anhydrous state with the following molar relations:

$$x\,(M_{1/n}XO_2){:}y\,YO_2{:}SiO_2{:}z\,R$$

wherein:
x represents a value of less than 0.1, which can be equal to zero
y has a value of less than 0.1, which can be equal to zero
z has a value of between 0 and 0.1;
M is selected from among $H^+$, $NH^{4+}$, one or more +n inorganic cations and combinations of same,
X represents one or more +3 oxidation state chemical elements,
Y represents one or more +4 oxidation state chemical elements, and
R represents one or more organic compounds.
X preferably represents one or more elements selected from among Al, Ga, B, Fe and Cr.
Y preferably represents one or more elements selected from among Si, Sn, Ti, Ge and V.
x preferably has a value of less than 0.056, which can be equal to zero;

The X-ray diffraction pattern of ITZ-30 as when synthesized obtained by the powder method using a fixed-divergence slit is characterized by interplanar spacing values (d) and relative intensities (I/Io) of the strongest reflections, shown in Table I hereinabove. In the aforementioned table, the relative intensities are listed according to the symbols as: VS=very strong (60-100), S=strong (40-60). M=medium (20-40) and W=weak (0-20). The relative positions, widths and intensities depend, to a certain degree, on the chemical composition of the material.

In addition thereto, the calcinated material has an X-ray diffraction pattern in accordance with that which is stated in Table II

TABLE II

| d(Å) (±0.3) | I/I$_o$ (%) |
|---|---|
| 12.19 | VS |
| 9.81 | S |
| 6.13 | S |
| 4.02 | M |
| 3.92 | S |
| 3.54 | M |
| 3.41 | VS |
| 3.30 | M | and a chemical composition in the calcinated and anhydrous state which can be represented by the following empirical formula:

$$x\,(M_{1/n}XO_2){:}y\,YO_2{:}SiO_2$$

wherein:
x represents a value of less than 0.1, preferably less than 0.056, which can be equal to zero;
y has a value of less than 0.1, preferably less than 0.05, and more preferably less than 0.02, which can be equal to zero;
M represents $H^+$, $NH^{4+}$ or one or more +n inorganic cations;
X represents one or more +3 oxidation state chemical elements, and
Y represents one or more +4 oxidation state chemical elements.
X preferably represents one or more elements selected from among Al, Ga, B, Fe and Cr.
Y preferably represents one or more elements selected from among Si, Sn, Ge, Ti, and V.

Table II shows the interplanar spacing values (d) and relative Intensities (I/Io) of the strongest reflections of the powder X-ray diffractogram of the same sample of ITQ-30 having shown the diffractogram of table I after being calcinated at 580° C. to eliminate the organic compounds occluded inside the zeolite.

According to a preferred embodiment of the invention, the laminar microporous crystalline zeolite material has an X-ray diffraction pattern in accordance with Table I

TABLE I

| d(Å) (±0.3) | I/I$_o$ (%) |
|---|---|
| 14.17 | VS |
| 12.13 | M |
| 10.63 | M |
| 4.65 | M |
| 3.98 | S |
| 3.42 | VS |
| 3.32 | M | as when synthesized,
it has an X-ray diffraction pattern in accordance with that stated in Table II

TABLE II

| d(Å) (±0.3) | I/I$_o$ (%) |
|---|---|
| 12.19 | VS |
| 9.81 | S |
| 6.13 | S |
| 4.02 | M |
| 3.92 | S |
| 3.54 | M |
| 3.41 | VS |
| 3.30 | M | for the calcinated material,
and has a chemical composition in the calcinated and anhydrous state which can be represented by the following empirical formula:

$$x\,(M_{1/n}XO_2){:}y\,YO_2{:}SiO_2$$

wherein:
x represents a value of less than 0.056, which can be equal to zero;
y has a value of less than 0.05, which can be equal to zero;
M represents H$^+$, NH$^{4+}$ or one or more +n inorganic cations; and combinations of same,
X represents one or more +3 oxidation state chemical elements, and
Y represents one or more +4 oxidation state chemical elements.
X represents preferably one or more elements selected from among Al, Ga, B, Fe and Cr.
Y represents preferably one or more elements selected from among Si, Sn, Ge, Ti and V.

According to a further preferred embodiment of this Invention, the crystalline material has a composition in accordance with the formula:

$$x\,(M_{1/n}XO_2){:}SiO_2$$

wherein:
x represents a value of less than 0.1, which can be equal to zero;
M represents selected from between H$^+$, NH$^{4+}$, one or more +n inorganic cations and combinations of same, and
X represents one or more +3 oxidation state chemical elements.

X preferably is selected from among Al, Ga, B, Cr, Fe and combinations of same.

According to a further preferred embodiment, the ITQ-30 crystalline material has a chemical composition in the calcinated and anhydrous state which can be presented by the following empirical equation:

$$y\,YO_2{:}SiO_2$$

wherein:
y has a value of less than 0.1. which can be equal to zero; and
Y represents one or more +4 oxidation state chemical elements.
y preferably has a value of less than 0.05, which can be equal to zero.

According to a further preferred embodiment, the microporous crystalline material has a chemical composition in the calcinated and anhydrous state which can be presented by the following empirical equation:

$$x\,(HXO_2){:}SiO_2$$

wherein:
X represents one or more trivalent elements and
x has a value of less than 0.1, preferably of less than 0.056, which can be zero.

According to a further preferred embodiment, the crystalline material has a chemical composition In the calcinated and anhydrous state which can be represented by the empirical formula SiO$_2$.

It is however possible, in terms of the synthesis method and of the calcination or subsequent treatments thereof, for flaws to exist in the crystalline network, which are revealed by the presence of Si—OH groups (silanols). These flaws have not been included in the aforementioned empirical formulas.

The invention is also related to a method of synthesizing the laminar microporous crystalline zeolite material known as ITQ-30, which comprises:
preparing a reaction mixture comprising at least:
a source of SiO$_2$,
an organic compound, R,
a source of fluoride ions and
water, and
heating the aforesaid mixture with or without stirring to a temperature between 80 and 200° C. until the crystallization thereof Is achieved,
and in which the reaction mixture is of a composition, in terms of oxide molar relations, within the following ranges
ROH/SiO$_2$=0.01-1.0, preferably 0.1-1.0
H$_2$O/SiO$_2$=0-100

The heating is performed at a temperature between 80 and 200° C., preferably between 130 and 200° C. This thermal treatment of the reaction mixture can be performed in static or under stirring of the mixture. Following completion of the crystallization, the solid product is separated and dried. The subsequent calcination at temperatures between 400 and 600° C., preferably between 450 and 600° C. causes the breakdown and elimination of the organic residue occluded in the zeolite, leaving the zeolite channels free.

The source of SiO$_2$ can be, for purposes of example, tetraethylorthosilicate, colloidal silica, amorphous silica or combinations of same.

As a source of fluoride ions, for example, fluorhydric acid or ammonium fluoride can be used.

According to one particular embodiment, the ITQ-30 synthesis method comprising:
preparing a reaction mixture comprising at least:
a source of SiO$_2$,
a source of one or more Y tetravalent elements, an organic compound, R,
a source of fluoride ions and
water, and
heating the aforesaid mixture with or without stirring to a temperature between 80 and 200° C. until the crystallization thereof is achieved,
and the reaction mixture is of a composition, in terms oxide molar relations, within the following ranges
$YO_2/SiO_2$=0-0.1, preferably 0-0.05, and more preferably 0-0.02,
$ROH/SiO_2$=0.01-1.0, preferably 0.1-1.0
$H_2O/SiO_2$=0-100.

The aforementioned Y tetravalent elements are preferably selected from among Ti, Ge, V, Sn and combinations of same. The addition of this element or these elements can be done prior to the heating of the reaction mixture or at a middle time during said heating.

According to one further particular embodiment, the method for synthesizing crystalline zeolite material comprises:
preparing a reaction mixture comprising at least:
a source of $SiO_2$,
a source of one or more X trivalent elements,
an organic compound, R,
a source of fluoride ions and
water, and
heating the aforesaid mixture with or without stirring to a temperature between 80 and 200° C. until the crystallization thereof is achieved,
and the reaction mixture is of a composition, in terms of oxide molar relations, within the following ranges
$X_2O_3/SiO_2$=0-0.05, preferably 0-0.028,
$ROH/SiO_2$=0.01-1.0, preferably 0.1-1.0
$H_2O/SiO_2$=0-100.

The trivalent elements are preferably selected from among Al, Ga, B, Fe and Cr. As a source of aluminum, aluminum alcoxides, aluminum oxides or aluminum salts can be used, among others. This element or these elements can be added prior to heating the reaction mixture or at an intermediate time during said heating.

According to one further particular embodiment, the method for synthesizing crystalline zeolite material comprises:
preparing a reaction mixture comprising at least:
a source of $SiO_2$,
a source of one or more Y tetravalent elements,
a source of one or more X trivalent elements
an organic compound, R,
a source of fluoride ions and
water, and
heating the aforesaid mixture with or without stirring to a temperature between 80 and 200° C. until the crystallization thereof is achieved,
and the reaction mixture is of a composition, in terms of oxide molar relations, within the following ranges
$YO_2/SiO_2$=0-0.1, preferably 0-0.05 and more preferably 0-0.02,
$X_2O_3/SiO_2$=0-0.05, preferably 0-0.028,
$ROH/SiO_2$=0.01-1.0, preferably 0.1-1.0
$H_2O/SiO_2$=0-100.

The aforementioned Y tetravalent elements are preferably selected from among Ti, Ge, V, Sn and combinations of same. The trivalent elements are preferably selected from among Al, Ga, B, Fe and Cr. As a source of aluminum, aluminum alcoxides, aluminum oxides or aluminum salts can be used, among others. This element or these elements can be added prior to heating the reaction mixture or at a middle time during said heating.

In the method for synthesizing ITQ-30 defined hereinabove, and for any of the embodiments thereof, the organic cation R preferably represents N(16)-methyl-sparteinium.

In the method for synthesizing ITQ-30 defined hereinabove, the organic cation or organic cations are preferably added in a form selected from among hydroxide form, salt form, and mixture of same. When the organic cation is used in salt form, those preferred are, for example, halides, preferably chloride or bromide.

Said organic cation N(16)-methyl-sparteinium is preferably added in hydroxide form or in the form of a mixture of hydroxide and another salt, said salt preferably being a halide.

According to one particular embodiment of the method of synthesizing ITQ-30 crystalline material, a quantity of crystalline material is added to the reaction mixture as a crystallization promoter, said quantity ranging from 0.01 to 15% in weight with respect to the total inorganic oxides added, preferably ranging from 0.01 to 5% in weight with respect to the total inorganic oxides added. Also preferably, said crystalline material added as a crystallization promoter is a crystalline material possessing the characteristics of the laminar microporous crystalline ITQ-30 material of this invention.

According to one particular embodiment, the composition of the reaction mixture is that of the general empirical equation

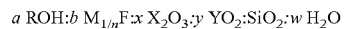

$$a\,ROH{:}b\,M_{1/n}F{:}x\,X_2O_3{:}y\,YO_2{:}SiO_2{:}w\,H_2O$$

wherein
M represents $H^+$, $NH_4^+$ or one or more +n organic or inorganic cations; X represents one or more trivalent elements, preferably Al, B, Ga, Cr, Fe or combinations of same; Y represents one or more tetravalent elements, preferably Ti, Ge, Sn, V or combinations of same; R represents one or more organic cations, preferably N(16)-methyl-sparteinium; and the values of a, b, x, y and w are within the following ranges:
a=$ROH/SiO_2$=0.01-1.0, preferably 0.1-1.0,
b=$M_{1/n}F/SiO_2$=0-1.0, preferably 0.1-1.0.
x=$X_2O_3/SiO_2$=0-0.05, preferably 0-0.028,
y=$YO_2/SiO_2$=0-0.1, preferably 0-0.05 and more preferably 0-0.02,
w=$H_2O/SiO_2$=0-100, preferably 1-50 and more preferably 1-15.

The present invention also relates to a method of using ITQ-30 zeolite as an active catalytic component in an organic compound transformation process, which comprises putting a feed supply into contact with a quantity of said microporous crystalline material.

According to one particular embodiment, the aforementioned process is catalytic cracking of organic compounds, preferably hydrocarbons.

According to one further particular embodiment, the aforementioned process is selected from among hydrocracking, soft hydrocracking, light paraffin isomerization, deparaffinning, isodeparaffining and alkylation.

According to one further particular embodiment, the aforementioned alkylation process is an alkylation of olefins or alcohols, of compounds selected from among aromatic compounds, substituted aromatic compounds, thiophenic compounds, alkylthiophenic, benzothiophenic and alkylbenzothiophenic compounds.

The aforementioned alkylation is particularly preferred to be a benzene alkylation process with propylene.

According to one further particular embodiment, the aforementioned process is selected from among a substituted aromatic compound acylation process using acids, acid chlorides or organic acid anhydrides as acylating agents.

According to one further particular embodiment, the aforementioned process is a Meerwein-Pondorf-Verley reaction.

According to one further particular embodiment, the aforementioned process is a selective oxidation of organic compounds using an oxidating agent selected from among $H_2O_2$, peroxides and organic hydroperoxides.

According to one further particular embodiment, the aforementioned process is a Baeyer-Villiger oxidation.

According to one further particular embodiment, the aforementioned ITQ-30 crystalline material contains Ti, and the process is selected from among olefin epoxidation, alkane oxidation, alcohol oxidation and oxidation of organic sulfur-containing compounds which can produce sulfoxides and sulfones, by using organic or inorganic hydroperoxides as oxidating agents. The aforementioned organic or inorganic hydroperoxides can be, for example, $H_2O_2$, tert-butyl hydroperoxide or cumene hydroperoxide.

According to a further particular embodiment, the aforementioned crystalline material contains Ti, and the process is a ketone amoximation, and more specifically from cyclohexanone to cyclohexanone oxime, with $NH_3$ and $H_2O$.

According to a further particular embodiment, the aforementioned crystalline material contains Sn, and the process is a Baeyer-Villiger oxidation using $H_2O_2$ as the oxidating agent.

EXAMPLES

Example 1

Preparation of N(16)-methylsparteinium hydroxide 20.25 g of (−)-sparteine are mixed with 100 ml of acetone. To this mixture, 17.58 g of methyl iodide are progressively added, drop by drop, while the mixture is under stirring. Twenty-four hours later, a cream-colored precipitate appears. 200 ml of diethyl ether are added to the reaction mixture, the mixture is filtered and the solid obtained is vacuum-dried. The product is N(16)-methylsparteinium iodide with above a 95% yield.

The iodide is exchanged for hydroxide using ion-exchange resin, according to the following procedure: 31.50 g of N(16)-methylsparteinium iodide are dissolved in 92.38 g of water. To the resulting solution, 85 g of Dowes BR resin, previously washed with distilled water to pH=7 are added and kept under stirring until the following day. Afterward, it is filtered and washed with distilled water, obtaining 124.36 g of N(16)-methylsparteinium hydroxide solution with a concentration of 0.65 moles/Kg.

Example 2

0.272 grams of aluminum isopropoxide and 4.167 grams of tetraethylorthosilicate are hydrolyzed in 11.00 grams of N(16)-methylsparteinium hydroxide solution with a concentration of 0.91 moles/Kg. The resulting solution is kept under stirring, allowing all the alcohol formed in the hydrolysis and the excess water to evaporate. Afterward, 0.416 g of a fluorhydric acid solution (48.1% HF by weight) is added and continued evaporating until the reaction mixture reaches a final composition of:

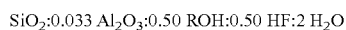

wherein ROH is N(16)-methylsparteinium hydroxide.

The gel is heated to 175° C. in static for 3 days in teflon-lined steel autoclaves. The solid obtained after filtering and washing with distilled water and drying at 100° C. is ITQ-30. The X-ray diffraction pattern of the resulting solid is shown in Table III.

TABLE III

| 2 theta (°) (±0.3) | d(Å) (±0.3) | $I/I_o$ (%) |
|---|---|---|
| 6.24 | 14.17 | 90 |
| 7.29 | 12.13 | 31 |
| 8.32 | 10.63 | 26 |
| 12.90 | 6.86 | 10 |
| 14.63 | 6.05 | 16 |
| 15.59 | 5.69 | 23 |
| 19.08 | 4.65 | 32 |
| 20.03 | 4.43 | 27 |
| 21.65 | 4.11 | 36 |
| 22.32 | 3.98 | 47 |
| 25.06 | 3.55 | 37 |
| 26.08 | 3.42 | 100 |
| 26.85 | 3.32 | 35 |
| 28.25 | 3.16 | 11 |
| 29.27 | 3.05 | 6 |
| 31.71 | 2.82 | 5 |
| 33.49 | 2.68 | 3 |
| 36.43 | 2.47 | 4 |
| 37.91 | 2.37 | 5 |

The material is calcinated at 580° C. for 3 hours in air flow to eliminate the organic matter and the fluoride ions occluded on the inside thereof. The power X-ray diffraction pattern of the resulting solid coincides with the values in Table IV.

TABLE IV

| 2 theta (°) (±0.3) | d(Å) (±0.3) | $I/I_o$ (%) |
|---|---|---|
| 7.25 | 12.19 | 100 |
| 9.01 | 9.81 | 38 |
| 12.98 | 6.82 | 11 |
| 14.45 | 6.13 | 43 |
| 15.97 | 5.55 | 10 |
| 20.20 | 4.40 | 15 |
| 21.76 | 4.08 | 21 |
| 22.11 | 4.02 | 28 |
| 22.69 | 3.92 | 40 |
| 23.69 | 3.76 | 20 |
| 25.15 | 3.54 | 25 |
| 26.14 | 3.41 | 80 |
| 27.04 | 3.30 | 24 |
| 28.24 | 3.16 | 12 |
| 31.76 | 2.82 | 5 |
| 33.57 | 2.67 | 6 |
| 34.99 | 2.56 | 3 |

Example 3

8.33 g tetraethylorthosilicate and 0.33 g aluminum isopropoxide are hydrolyzed in 21.78 g N(16)-methylsparteinium hydroxide solution with a concentration of 0.94 moles/Kg. The resulting solution is kept under stirring allowing the ethanol and the isopropanol formed in the hydrolysis to evaporate. Afterward, 0.83 g of a fluorhydric acid solution (48.1% of HF by weight) are added and continued evaporating until the mixture reaches the composition:

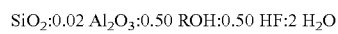

wherein ROH is N(16)-methylsparteinium hydroxide.

The gel is heated to 175° C. in static for 4 days in teflon-lined steel autoclaves. The resulting solid, after filtering, washing with distilled water and drying at 100° C. is ITQ-30.

Example 4

0.21 g of aluminum isopropoxide and 5.21 g of tetraethylorthosilicate are hydrolyzed in 11.26 g of N(16)-methylsparteinium hydroxide solution with a concentration of 1.10 moles/Kg. In the resulting solution all the alcohol formed in the hydrolysis and the excess water is allowed to evaporate. Afterward, 0.52 g of a fluorhydric acid solution (48.1% of HF by weight) is added. The final composition of the synthesized gel is:

$SiO_2:0.01\ Al_2O_3:0.50\ ROH:0.50\ HF:2\ H_2O$ wherein ROH is N(16)-methylsparteinium hydroxide.

The gel is heated to 175° C. in static for 5 days in teflon-lined steel autoclaves. The resulting solid, after filtering, washing with distilled water and drying at 100° C. is ITQ-30.

Example 5

34.67 g of tetraethylorthosilicate Is hydrolyzed in 73.45 g of N(16)-methylsparteinium hydroxide solution with a concentration of 1.133 moles/Kg, keeping under stirring and allowing all of the ethanol formed in the hydrolysis to evaporate. Afterward, 3.55 g of a fluorhydric acid solution (46.9% of HF by weight) is added and continued evaporating until the reaction mixture reaches a final composition:

$SiO_2:0.05\ ROH:0.50\ HF:3\ H_2O$ wherein ROH is N(16)-methylsparteinium hydroxide.

Following 29 days of crystallization at 135° C. under stirring in teflon-lined steel autoclaves, a solid is obtained, the diffractogram of which coincides with that described for ITQ-30 zeolite.

Example 6

11.66 g of tetraethylorthosilicate and 0.91 g of aluminum isopropoxide are hydrolyzed in 29.78 g N(16)-methylsparteinium hydroxide solution with a concentration of 0.94 moles/Kg The resulting solution is kept under stirring allowing the ethanol and isopropanol formed in the hydrolysis to evaporate. Afterward, 1.16 g of fluorhydric acid solution (48.1% HF in weight) is added and continued evaporating until the mixture reaches the composition:

$SiO_2:0.04\ Al_2O_3:0.50\ ROH:0.50\ HF:3\ H_2O$ wherein ROH is N(16)-methylsparteinium hydroxide.

The gel is heated for 5 days in teflon-lined steel autoclaves at 175° C. in static. The resulting solid, after filtering, washing with distilled water and drying at 100° C. is ITQ-30.

The invention claimed is:

1. A laminar, microporous crystalline zeolite material wherein it has an X-ray diffraction pattern in accordance with Table I

TABLE I

| d(Å) (±0.3) | I/I$_o$ (%) |
|---|---|
| 14.17 | VS |
| 12.13 | M |
| 10.63 | M |
| 4.65 | M |
| 3.98 | S |
| 3.42 | VS |
| 3.32 | M | as when synthesized, in which the relative intensities mean VS=very strong (60-100), S=strong (40-60), M=medium (20-40) and W=weak (0-20), and because it has a chemical composition in the anhydrous state with the following molar relations:

$x\ (M_{1/n}XO_2):y\ YO_2:SiO_2:z\ R$ where:
x represents a value of less than 0.1, which can be equal to zero
y has a value of less than 0.1, which can be equal to zero
z has a value of between zero and 0.1;
M represents H$^+$,
X represents one or more +3 oxidation state chemical elements,
Y represents one or more +4 oxidation state chemical elements, and
R represents N(16)-methyl-sparteinium.

2. A laminar, microporous crystalline zeolite material according to claim 1 wherein it has in its calcined state an X-ray diffraction pattern in accordance with Table II

TABLE II

| d(Å) (±0.3) | I/I$_o$ (%) |
|---|---|
| 12.19 | VS |
| 9.81 | S |
| 6.13 | S |
| 4.02 | M |
| 3.92 | S |
| 3.54 | M |
| 3.41 | VS |
| 3.30 | M | in which the relative intensities mean VS=very strong (60-100), S=strong (40-60), M=medium (20-40) and W=weak (0-20), and with a chemical composition in the calcined and anhydrous state that can be represented by the following empirical formula:

$x\ (M_{1/n}XO_2):y\ YO_2:SiO_2$ where:
x represents a value of less than 0.1, which can be equal to zero;
y has a value of less than 0.1, which can be equal to zero;
M represents H$^+$;
X represents one or more +3 oxidation state chemical elements, and
Y represents one or more +4 oxidation state chemical elements.

3. A microporous crystalline zeolite material wherein it has an X-ray diffraction pattern in accordance with Table I

TABLE I

| d(Å) (±0.3) | I/I$_o$ (%) |
|---|---|
| 14.17 | VS |
| 12.13 | M |
| 10.63 | M |
| 4.65 | M |
| 3.98 | S |
| 3.42 | VS |
| 3.32 | M | as when synthesized,
an X-ray diffraction pattern in accordance with Table II

TABLE II

| d(Å) (±0.3) | I/I$_o$ (%) |
|---|---|
| 12.19 | VS |
| 9.81 | S |
| 6.13 | S |
| 4.02 | M |
| 3.92 | S |
| 3.54 | M |
| 3.41 | VS |
| 3.30 | M | in its calcined state, in which the relative intensities mean VS=very strong (60-100), S=strong (40-60), M=medium (20-40) and W=weak (0-20), and with a chemical composition in the calcined and anhydrous state that can be represented by the following empirical formula:

$$x\,(M_{1/n}XO_2):y\,YO_2:SiO_2$$

where:
- x has a value of less than 0.056, which can be equal to zero;
- y has a value of less than 0.05, which can be equal to zero;
- M represents H$^+$;
- X represents one or more +3 oxidation state chemical elements, and
- Y represents one or more +4 oxidation state chemical elements.

4. The microporous crystalline material according to claim 1, wherein X represents one or more elements selected from among Al, Ga, B, Fe and Cr.

5. The microporous crystalline material according to claim 2, wherein X represents one or more elements selected from among Al, Ga, B, Fe and Cr.

6. The microporous crystalline material according to claim 1, wherein Y represents one or more elements selected from among Si, Sn, Ge, Ti and V.

7. The microporous crystalline material according to claim 2, wherein Y represents one or more elements selected from among Si, Sn, Ge, Ti and V.

8. The crystalline material according to claim 2, wherein the composition thereof is in accordance with the formula:

$$x\,(M_{1/n}XO_2):SiO_2$$

where:
- x has a value of less than 0.01, which can be equal to zero;
- M is H$^+$, and
- X is one or more +3 oxidation state chemical elements.

9. The crystalline material according to claim 8, wherein X represents one or more chemical elements selected from among Al, Ga, B, Fe and Cr.

10. The crystalline material according to claim 8, wherein x represents a value of less than 0.056, which can be equal to zero.

11. The crystalline material according to claim 2, wherein the chemical composition thereof in the calcined and anhydrous state can be represented by the following empirical formula $$y\,YO_2:SiO_2$$

where:
- y represents a value of less than 0.1, which can be equal to zero; and
- Y represents one or more +4 oxidation state chemical elements.

12. The crystalline material according to claim 11, wherein y represents a value of less than 0.05, which can be equal to zero.

13. The microporous crystalline zeolite material according to claim 2, wherein the chemical composition thereof in the calcined and anhydrous state can be represented by the empirical formula $$x\,(HXO_2):SiO_2$$

where:
- X represents a trivalent element, and
- x has a value of less than 0.1.

14. The microporous crystalline material according to claim 13, wherein x represents a value of less than 0.056.

15. The microporous crystalline material according to claim 2, wherein the chemical composition thereof in the calcined and anhydrous state can be represented by the empirical formula SiO$_2$.

16. Method for synthesizing a crystalline zeolite material as defined in claim 1, wherein it comprises:
preparing a reaction mixture comprising at least:
- a source of SiO$_2$,
- R(16)-methyl-sparteinium,
- a source of fluoride ions and
- water, and heating the aforesaid mixture with or without stirring to a temperature of 80-200° C. until the crystallization thereof is achieved,
and in which the reaction mixture is of a composition, in terms of oxide molar relations, within the following ranges
ROH/SiO$_2$=0.01-1.0,
H$_2$O/SiO$_2$=0-100.

17. Method for synthesizing a crystalline zeolite material as defined in claim 2, wherein it comprises:
preparing a reaction mixture comprising at least:
- a source of SiO$_2$,
- R(16)-methyl-sparteinium,
- a source of fluoride ions and
- water, and heating the aforesaid mixture with or without stirring to a temperature of 80-200° C. until the crystallization thereof is achieved,
and in which the reaction mixture is of a composition, in terms of oxide molar relations, within the following ranges
ROH/SiO$_2$=0.01-1.0,
H$_2$O/SiO$_2$=0-100.

18. Method for synthesizing a crystalline zeolite material according to claim 16, wherein it comprises:
preparing a reaction mixture comprising at least:
- a source of SiO$_2$,
- a source of one or more Y tetravalent elements,
- R(16)-methyl-sparteinium,
- a source of fluoride ions and
- water, and heating the aforesaid mixture with or without stirring to a temperature between 80 and 200° C. until the crystallization thereof is achieved,
and the reaction mixture is of a composition, in terms of oxide molar relations, within the following ranges
YO$_2$/SiO$_2$=0-0.1,
ROH/SiO$_2$=0.01-1.0,
H$_2$O/SiO$_2$=0-100.

19. Method for synthesizing a crystalline zeolite material according to claim 17, wherein it comprises:
preparing a reaction mixture comprising at least:

a source of SiO$_2$,
a source of one or more Y tetravalent elements,
R(16)-methyl-sparteinium,
a source of fluoride ions and
water, and
heating the aforesaid mixture with or without stirring to a temperature between 80 and 200° C. until the crystallization thereof is achieved,
and the reaction mixture is of a composition, in terms of oxide molar relations, within the following ranges
YO$_2$/SiO$_2$=0-0.1,
ROH/SiO$_2$=0.01-1.0,
H$_2$O/SiO$_2$=0-100.

20. Method for synthesizing a crystalline zeolite material according to claim 16, wherein it comprises:
preparing a reaction mixture comprising at least:
a source of SiO$_2$,
a source of one or more X trivalent elements,
R(16)-methyl-sparteinium,
a source of fluoride ions and
water, and
heating the aforesaid mixture with or without stirring to a temperature between 80 and 200° C. until the crystallization thereof is achieved,
and the reaction mixture is of a composition, in terms of oxide molar relations, within the following ranges
X$_2$O$_3$/SiO$_2$=0-0.05,
ROH/SiO$_2$=0.01-1.0,
H$_2$O/SiO$_2$=0-100.

21. Method for synthesizing a crystalline zeolite material according to claim 17, wherein it comprises:
preparing a reaction mixture comprising at least:
a source of SiO$_2$,
a source of one or more X trivalent elements,
R(16)-methyl-sparteinium,
a source of fluoride ions and
water, and
heating the aforesaid mixture with or without stirring to a temperature between 80 and 200° C. until the crystallization thereof is achieved,
and the reaction mixture is of a composition, in terms of oxide molar relations, within the following ranges
X$_2$O$_3$/SiO$_2$=0-0.05,
ROH/SiO$_2$=0.01-1.0,
H$_2$O/SiO$_2$=0-100.

22. Method for synthesizing a crystalline zeolite material according to claim 16, wherein it comprises:
preparing a reaction mixture comprising at least:
a source of SiO$_2$,
a source of one or more Y tetravalent elements,
a source of one or more X trivalent elements
R(16)-methyl-sparteinium,
a source of fluoride ions and
water, and
heating the aforesaid mixture with or without stirring to a temperature between 80 and 200° C. until the crystallization thereof is achieved,
and in which the reaction mixture is of a composition, in terms of oxide molar relations, within the following ranges:
YO$_2$/SiO$_2$=0-0.1,
X$_2$O$_3$/SiO$_2$=0-0.05,
ROH/SiO$_2$=0.01-1.0,
H$_2$0/SiO$_2$=0-100.

23. Method for synthesizing a crystalline zeolite material according to claim 17, wherein it comprises:
preparing a reaction mixture comprising at least:
a source of SiO$_2$,
a source of one or more Y tetravalent elements,
a source of one or more X trivalent elements
R(16)-methyl-sparteinium,
a source of fluoride ions and
water, and
heating the aforesaid mixture with or without stirring to a temperature between 80 and 200° C. until the crystallization thereof is achieved,
and in which the reaction mixture is of a composition, in terms of oxide molar relations, within the following ranges:
YO$_2$/SiO$_2$=0-0.1,
X$_2$O$_3$/SiO$_2$=0-0.05,
ROH/SiO$_2$=0.01-1.0,
H$_2$O/SiO$_2$=0-100.

24. Method for synthesizing the crystalline material according to claim 16, wherein the composition of the reaction mixture can be represented by the general empirical formula $$a\ ROH{:}b\ M_{1/n}F{:}x\ X_2O_3{:}y\ YO_2{:}SiO_2{:}w\ H_2O$$

where
M represents H$^+$;
X represents one or more trivalent elements
Y represents one or more tetravalent elements,
R represents N(16)-methyl-sparteinium,
a=ROH/SiO$_2$=0.01-1.0,
b=M$_{1/n}$F/SiO$_2$=0-1.0,
x=X$_2$O$_3$/SiO$_2$=0-0.05,
y=YO$_2$/SiO$_2$=0-0.1,
w=H$_2$O/SiO$_2$=0-100.

25. Method for synthesizing the crystalline material according to claim 17, wherein the composition of the reaction mixture can be represented by the general empirical formula $$a\ ROH{:}b\ M_{1/n}F{:}x\ X_2O_3{:}y\ YO_2{:}SiO_2{:}w\ H_2O$$

where
M represents H$^+$;
X represents one or more trivalent elements
Y represents one or more tetravalent elements,
R represents N(16)-methyl-sparteinium,
a=ROH/SiO$_2$=0.01-1.0,
b=M$_{1/n}$F/SiO$_2$=0-1.0,
x=X$_2$O$_3$/SiO$_2$=0-0.05,
y=YO$_2$/SiO$_2$=0-0.1,
w=H$_2$O/SiO$_2$=0-100.

26. Method for synthesizing the crystalline material according to claim 16, wherein the organic cation R is N(16)-methyl-sparteinium.

27. Method for synthesizing the crystalline material according to claim 26, wherein the organic cation N(16)-methyl-sparteinium is added in hydroxide form or in the form of a mixture of hydroxide with another salt.

28. Method for synthesizing the crystalline material according to claim 26, wherein the aforementioned salt is a halide.

29. Method for synthesizing the crystalline material according to claim 16, wherein a quantity of crystalline material is added to the reaction mixture as a crystallization promoter, the aforementioned quantity ranging from between 0.01 and 15% by weight with respect to the total inorganic oxides added.

30. Method for synthesizing the crystalline material according to claim 29, wherein the crystalline material is a laminar, microporous crystalline zeolite material wherein it has an X-ray diffraction pattern in accordance with Table I

TABLE I

| d(Å) (±0.3) | I/I$_o$ (%) |
|---|---|
| 14.17 | VS |
| 12.13 | M |
| 10.63 | M |
| 4.65 | M |
| 3.98 | S |
| 3.42 | VS |
| 3.32 | M | as when synthesized, in which the relative intensities mean VS=very strong (60-100), S=strong (40-60), M=medium (20-40) and W=weak (0-20), and because it has a chemical composition in the anhydrous state with the following molar relations:

$$x\,(M_{1/n}XO_2){:}y\,YO_2{:}SiO_2{:}z\,R$$

where:
x represents a value of less than 0.1, which can be equal to zero
y has a value of less than 0.1, which can be equal to zero
z has a value of between zero and 0.1;
M represents H$^+$,
X represents one or more +3 oxidation state chemical elements,
Y represents one or more +4 oxidation state chemical elements, and
R represents N(16)-methyl-sparteinium.

31. Method for synthesizing the crystalline material according to claim 29, wherein the crystalline material is a laminar, microporous crystalline zeolite material wherein it has an X-ray diffraction pattern in accordance with Table I

TABLE I

| d(Å) (±0.3) | I/I$_o$ (%) |
|---|---|
| 14.17 | VS |
| 12.13 | M |
| 10.63 | M |
| 4.65 | M |
| 3.98 | S |
| 3.42 | VS |
| 3.32 | M | as when synthesized, in which the relative intensities mean VS=very strong (60-100), S=strong (40-60), M=medium (20-40) and W=weak (0-20), and because it has a chemical composition in the anhydrous state with the following molar relations:

$$x\,(M_{1/n}XO_2){:}y\,YO_2{:}SiO_2{:}z\,R$$

where:
x represents a value of less than 0.1, which can be equal to zero
y has a value of less than 0.1, which can be equal to zero
z has a value of between zero and 0.1;
M represents H$^+$,
X represents one or more +3 oxidation state chemical elements,
Y represents one or more +4 oxidation state chemical elements, and
R represents N(16)-methyl-sparteinium
wherein the zeolite material has in its calcined state an X-ray diffraction pattern in accordance with Table II

TABLE II

| d(Å) (±0.3) | I/I$_o$ (%) |
|---|---|
| 12.19 | VS |
| 9.81 | S |
| 6.13 | S |
| 4.02 | M |
| 3.92 | S |
| 3.54 | M |
| 3.41 | VS |
| 3.30 | M | in which the relative intensities mean VS=very strong (60-100), S=strong (40-60), M=medium (20-40) and W=weak (0-20), and with a chemical composition in the calcined and anhydrous state that can be represented by the following empirical formula:

$$x\,(M_{1/n}XO_2){:}y\,YO_2{:}SiO_2$$

where:
x represents a value of less than 0.1, which can be equal to zero;
y has a value of less than 0.1, which can be equal to zero;
M represents H$^+$;
X represents one or more +3 oxidation state chemical elements, and
Y represents one or more +4 oxidation state chemical elements.

32. Method for synthesizing the crystalline material according to claim 29, wherein a quantity of crystalline material is added to the reaction mixture as a crystallization promoter, the aforementioned quantity ranging from between 0.01 and 5% by weight with respect to the total inorganic oxides added.

33. Method of using the laminar microporous crystalline material ITQ-30 as defined in claim 1 as a catalytically active component in an organic compound transformation process, which comprises putting a feed supply into contact with a quantity of said microporous, crystalline material.

34. Method of using the laminar microporous crystalline material ITQ-30 as defined in claim 2 as a catalytically active component in an organic compound transformation process, which comprises putting a feed supply into contact with a quantity of said microporous, crystalline material.

35. Method of using the laminar microporous crystalline material ITQ-30 according to claim 34, wherein the aforementioned process is catalytic cracking of organic compounds.

36. Method of using the laminar microporous crystalline material ITQ-30 according to claim 35, wherein the aforementioned organic compounds are hydrocarbons.

37. Method of using the laminar microporous crystalline material ITQ-30 according to claim 34, wherein the aforementioned process is selected from among hydrocracking, soft hydrocracking, light paraffin isomerization, deparaffining, isodeparaffinning and alkylation.

38. Method of using the laminar microporous crystalline material ITQ-30 according to claim 37, wherein the aforementioned alkylation is an alkylation with olefins or alcohols, of compounds selected from among aromatic compounds, substituted aromatic compounds, thiophenic, aklythiophenic, benzothiophenic and alkylbenzothiophenic compounds.

39. Method of using the laminar microporous crystalline material ITQ-30 according to claim 38, wherein the aforementioned alkylation is a benzene alklylation process with propylene.

40. Method of using the laminar microporous crystalline material ITQ-30 according to claim 34, wherein the aforementioned process is selected from among a substituted aromatic compound acylation process using acids, acid chlorides or organic acid anhydrides as acylating agents.

41. A method of using the ITQ-30 laminar microporous crystalline material, according to claim 34, wherein the aforementioned process is a Meerwein-Pondorf-Verley reaction.

42. Method of using the laminar microporous crystalline material ITQ-30 according to claim 34, wherein the process is a selective oxidation of organic compounds using an oxidating agent selected from among, $H_2O_2$, peroxides and organic hydroperoxides.

43. Method of using the laminar microporous crystalline material ITQ-30 according to claim 34, wherein the process is a Baeyer-Villiger oxidation.

44. Method of using the laminar microporous crystalline material ITQ-30 according to claim 34, wherein the aforementioned crystalline material contains Ti, and the process is selected from among olefin epoxidation, alkane oxidation, alcohol oxidation and oxidation of organic sulfur-containing compounds and which can produce sulfoxides and sulfones, by using organic or inorganic hydroperoxides as oxidating agents.

45. Method of using the laminar microporous crystalline material ITQ-30 according to claim 34, wherein the aforementioned crystalline material contains Ti, and the process is a ketone amoximation.

46. Method of using the laminar microporous crystalline material ITQ-30 according to claim 34, wherein the aforementioned crystalline material contains Sn, and the process is a Baeyer-Villiger oxidation using $H_2O_2$ as the oxidating agent.

* * * * *